United States Patent [19]

Weininger et al.

[11] 3,793,060

[45] Feb. 19, 1974

[54] METALLIZED ULTRAFINE POROUS POLYMER ARTICLES

[75] Inventors: Joseph L. Weininger, Schenectady, N.Y.; Maynard C. Agens, Sarasota, Fla.

[73] Assignee: General Electric Company, Schenectady, N.Y.

[22] Filed: June 3, 1971

[21] Appl. No.: 149,804

[52] U.S. Cl................. 117/98, 117/68, 117/160 R, 117/227, 317/258
[51] Int. Cl............................................. C23c 3/02
[58] Field of Search........ 117/98, 47 A, 160 R, 227; 317/258

[56] References Cited
UNITED STATES PATENTS

| | | | |
|---|---|---|---|
| 3,531,699 | 9/1970 | Peck.................................. | 317/258 |
| 3,585,467 | 6/1971 | Linzey et al. ....................... | 317/258 |
| 3,235,473 | 2/1966 | LeDuc............................ | 117/47 A X |
| 3,673,127 | 6/1972 | Weininger et al. ................ | 117/98 X |

OTHER PUBLICATIONS
Condensed Chemical Dictionary, 6th Ed., N.Y., Rheinhold, 1961, p. 114.

*Primary Examiner*—William D. Martin
*Assistant Examiner*—Janyce A. Bell
*Attorney, Agent, or Firm*—Gerhard K. Adam; Joseph T. Cohen; Jerome C. Squillaro

[57] ABSTRACT

Porous metal coated, ultrafine porous polymer articles and a process of producing such coated polymer articles are described. These materials may be prepared by incorporating an organic salt additive into a solid body of a crystalline thermoplastic polymer at a temperature of at least in the melting temperature range of the polymer to form a composite body, cooling the composite body until it solidifies, leaching out the salt additive to produce a polymeric body having an ultrafine porous structure, and treating at least one surface of the polymeric body with an electroless plating procedure whereby a porous metal coated, ultrafine porous polymer article is formed.

9 Claims, No Drawings

METALLIZED ULTRAFINE POROUS POLYMER ARTICLES

The copending application of Weininger et al., Ser. No. 127,848, filed Mar. 24, 1971, and assigned to the assignee of the present invention, discloses a process for producing solid, ultrafine porous polymer articles. These are made by uniformly incorporating an organic salt additive into a solid body of a crystalline thermoplastic polymer at or above its melting point and dissolving or leaching the salt from the composite body to form a polymer material having an ultrafine porous structure. More particularly, a solid body of a crystalline thermoplastic polymer or a blend of such a crystalline thermoplastic polymer and a thermoplastic polymer exhibiting up to 65 percent crystallinity is heated at a temperature of at least in its melting point range, an organic salt additive (e.g., soluble in water, alcohol, or other such organic liquids to which the polymer is substantially insoluble) is incorporated uniformly therein, which salt additive has the formula,

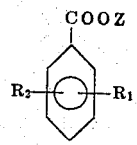

where Z is metal selected from the group consisting of alkali metals, and mixtures of such alkali metals and alkaline earth metals, $R_1$ is a radical selected from the group consisting of hydrogen, lower alkyl of one to four carbon atoms, aryl, and halogen, and $R_2$ is a radical selected from the group consisting of hydrogen, lower alkyl of one to four carbon atoms, aryl, and halogen. Such salts include sodium benzoate, lithium benzoate, potassium benzoate, a mixture of sodium benzoate and calcium benzoate, sodium para-t-butylbenzoate, and sodium parachlorobenzoate. The amount of the salt in the composite body is between 70-85 percent by weight of the total weight of the salt and the polymer body. After the salt is dissolved from the polymer body, the resulting polymer article has an ultrafine porous structure.

In accordance with the present invention, we have discovered a method of making a porous metal coated, ultrafine porous article by incorporating an organic salt additive into a solid body of a crystalline thermoplastic polymer at a temperature of at least in the melting point of the polymer to form a composite body, cooling the composite body until it solidifies, leaching out the salt additive to produce a polymeric body having an ultrafine porous structure and treating at least one surface of the polymeric body to a metallic coating procedure, whereby a porous metal coated, ultrafine porous polymer article is formed. When the porous polymeric body is in sheet form, the porous metal coating may be applied to either one or both sides. The porous metal coated, ultrafine porous polymer article may be used in electrochemical applications where the metallic phase acts as an electrode, and/or a current collector. In addition, the porous metal coated, ultrafine porous polymeric article may be subsequently impregnated with a dielectric liquid such that the resulting product is useful in making capacitors.

As used herein, the term "a polymeric body having an ultrafine porous structure" is defined as a polymeric body having a porosity of at least about 40 percent by volume and containing ultrafine and substantially uniformly distributed and interconnecting pores having an average diameter from 40–120 A.

The polymers useful in our invention include (a) solid, crystalline thermoplastic polymers which are defined as exhibiting greater than 70 weight percent crystallinity, and (b) such crystalline polymers of (a) which are blended with up to 50 weight percent of thermoplastic polymers exhibiting less than 65 weight percent crystallinity. The particular salts defined hereinabove provide unique media for forming the pores. It will be readily apparent to those skilled in the art that the particular polymer or copolymer chosen must be one which has enough rigidity that the reticulated structure does not collapse due to the resin flowing or contracting after removal of the salt at temperatures below the maximum temperature at which the ultrafine porous polymer article is used. In other words, the polymer should not cold flow in the temperature range of its use as a metallized ultrafine porous article, should not contract due to plastic or elastic memory after the soluble salt additive is extracted, and should be one that is capable of forming a self-supporting reticulated structure. In practicing our invention, we incorporate the soluble salt into the solid crystalline polymer or polymer blend by suitable means. For example, the two may be blended together in the dry state, but preferably are blended together by heating and mixing on hot compounding rolls or otherwise suitably mixed, for example, by use of a Banbury or other suitable blender, etc., at elevated temperatures in the melting point temperature range of the polymer where the two materials are mutually insoluble to obtain a completely uniform distribution of the salt in the polymer forming a composite body.

As far as we can determine solid crystalline thermoplastic polymers, which exhibit 70 percent crystallinity and have a melting temperature range of 100° to 270° C. and such crystalline polymers which are blended with up to 50 weight percent thermoplastic polymers which exhibit less than 65 percent crystallinity, form a heterogeneous mixture with the soluble salt additive at a temperature of at least in the melting temperature range of the crystalline polymer. The mixture is shaped by sheeting, molding, calendering, or extruding to form it into the desired shaped object, using a temperature in the range of the initial heating temperature of the polymer. The shaped body is cooled to room temperature at which the body is a solid having two intermixed, separate materials such that the polymer forms the ultrafine porous structure and the salt fills the pores. The polymer body is a solid, integral, structural network or reticulated structure surrounding the entrapped salt. Since the soluble salt phase is a separate material, it can be dissolved out leaving the polymer article as a unitary, ultrafine porous solid.

The salt is extracted or leached with a solvent, such as water, in which the salt is soluble but the polymer body is insoluble at the temperature used. In general, ambient temperature is preferred. The choice of solvent is governed chiefly by the procedure chosen for extraction of the salt. The only requirement it must meet is that it dissolve the salt, but not the polymer at the temperature used for extraction. Although solvents other than water can be used to dissolve the salt, for example, methyl alcohol, ethyl alcohol, and other solvents which do not dissolve the polymer at the temperature used for extraction, for convenience we generally prefer water to extract the salt from the polymer. A condensing vapor phase or other suitable method can also be used to remove the salt. The salt and solvent may be recovered and reused by evaporation, spray-drying, etc., of the solution of the salt in the solvent.

In practicing our invention, solid crystalline thermoplastic polymers which exhibit 70 percent crystallinity and have a melting point temperature range of 100° to 270° C. can be used. Such crystalline thermoplastic polymers can have blended therewith thermoplastic polymers which exhibit up to 65 percent crystallinity in an amount up to 50 weight percent. Specific examples of solid crystalline thermoplastic polymers, having a crystallinity of 75–95 weight percent, include crystalline polyethylene, crystalline polypropylene and crystalline copolymer of propylene and ethylene. Specific examples of solid thermoplastic polymers which exhibit up to 65 weight percent crystallinity, which can be blended with crystalline thermoplastic polymers in amounts up to 50 weight percent in the practice of our invention include polyethylene, polypropylene, etc. A description of the crystallinity of polyolefin is given by H.V. Boenig, Polyolefins: Structure and Properties, Elsevier (1966) pages 15–46.

The soluble salts used in our process are solid, water soluble materials and produce an ultrafine porous polymer article with a porosity of 40 percent and greater which are provided by ultrafine and substantially uniformly distributed continuous and interconnecting pores of diameter from 40 to 120 A. A salt such as sodium benzoate is used in its standard commercial size. An electron micrograph showed this salt to be in needle-like crystals, most of which were compacted into bundles of thicker strands. The crystals have a minimum length of 1 micron. The more important width of crystal particles varies from a minimum of about 800 A. to about 5,000 A. Other materials, such as sodium carbonate and sodium chloride, were found to be unsuitable in our process since they produced porous polymers with coarse pore sizes having an average diameter of 10,000 to 100,000 A. Also, materials such as sodium bicarbonate and starch failed to produce a uniform porous material.

We have also determined that ultrafine porous polymeric bodies can be obtained with a solid crystalline thermoplastic polymer or blend as above described and the organic salt additive only when the concentration of the salt phase in the polymer is greater than 70 percent, and no more than 85 percent by weight of the total weight of the salt and the polymer. If the amount of salt is substantially less than 70 percent, it is difficult to extract the salt from the polymer after it has been incorporated by mixing and heating, apparently because the polymer completely surrounds the salt and prevents its extraction. If the amount of salt is substantially greater than 85 percent, the heterogeneous mixture becomes too difficult to process. Softness and flexibility are dependent on the polymer. For example, ultrafine porous articles prepared from crystalline polystyrene are hard and rigid, while those prepared from crystalline polyethylene are soft and flexible. There is a decrease in thickness of the material when the salt is extracted from the composition. Because of crystallization during pore formation, the process yields ultrafine pores which are significantly smaller than the particulate cross-section of the added salt. As a further modification, the polymer can be cross-linked by high energy electron irradiation prior to or subsequent to dissolving the salt therefrom. The resulting product has an insoluble, cross-linked structure.

The ultrafine porous polymer body is then coated with a thin adherent layer of metal by an electroless plating process whereby plating occurs by means of a chemical reduction reaction. Electroless plating involves reduction of a metal salt to the metal, with the simultaneous oxidation of a chemical reducing agent. The advantage of electroless plating in our process is that it may be applied directly to the ultrafine porous polymer body which is a nonconductor. Among the factors to be considered in formulating the electroless plating solution are the concentration of the metal salt, the concentration of the reducing agent and the pH of the plating solution. Usually the metal being plated acts as a catalyst and the reaction appears to be autocatalytic. Metals which can be deposited this way are the platinum group metals and include nickel, cobalt, iron and copper. Electroless plating of silver and gold which are not sufficiently autocatalytic, require the use of plating solutions which decompose rapidly in order to deposit coatings of the metals. The thickness of the metal coating desired will, of course, vary with the application of the metal coated material according to the requirements of conductivity and porosity of the metal coating. Thus a 2,000 A coating has reasonably good electrical conduction in the metal phase. If greater conduction is required, the thickness of the coating may be increased by electroless deposition or by electroplating, with a possible loss however of some porosity of the metal coating.

The electroless plating step is illustrated by the use of electroless copper plating solutions which are well known in the art. These solutions are described in both the patent and technical literature. Typical, but not limiting, of this art are U.S. Pat. Nos. 2,874,072; 2,938,805; 2,996,408; 3,075,855; and 3,075,856; and copending applications of Agens et al., Ser. No. 811,012, filed Mar. 27, 1969, and Agens, Ser. No. 50,996, filed June 29, 1970, both of which are assigned to the assignee of the present invention, and the various literature and prior art cited and referred to in these patents. The teachings of all of this art with regard to compositions and techniques of use are hereby incorporated by reference. A typical electroless copper plating solution of the prior art is as follows:

$CuSO_4 \cdot 5H_2O$—25 g/l
$NiCl_2 \cdot 6H_2O$—1 g/l
Rochelle Salt $\cdot 4H_2O$—37.5 g/l
NaOH—16 g/l
Formaldehyde (37 percent Soln.)—15 ml/l Applying the electroless deposit of copper onto a surface of the polymeric body, having an ultrafine porous structure as described above, it was found that because of the hydrophobic nature of polymeric body the porous structure does not imbibe the aqueous solution from which the copper is deposited. Nor does it permit blocking of the ultrafine pores by plugging of pore openings, and thus the pore structure and pore openings are left substantially unchanged. Examination of the metal coating obtained by electroless deposition indicated that it was also porous in structure.

The porous metal coated, ultrafine porous polymer article may now be treated with a conventional dielectric liquid to impregnate the pores. A preferred class of dielectric liquids is generically designated as "askarels" which are synthetic nonflammable insulating liquids that when decomposed by an electrical arc evolve only nonflammable gaseous mixtures. The most widely used are chlorinated benzenes, e.g., trichlorobenzene and chlorinated diphenyls, e.g., pentachloro diphenyl. Each material is usually used as a mixture of its isomers from which its liquidity is derived. Most of the commercially available nonflammable insulating liquids comprise chlorinated diphenyls or mixtures of chlorinated diphenyls and chlorinated benzene and are sold under the trademarks PYRANOL and AROCLOR. The preferred compounds are trichloro diphenyl, tetrachloro diphenyl and pentachloro diphenyl.

In order that those skilled in the art may more readily understand our invention, the following examples are given by way of illustration and not by way of limitation. In these examples, the ratios of polymers to soluble solids are set forth as weight ratios.

In the following examples, various materials which were formed were tested subsequently to determine their porosity, electrical conductivity (when filled with an electrolytic solution), gas flow, and pore measurements. When particular materials of the examples are described as having been tested for one of the above properties, the same testing procedure was used.

The resistivity ratio of the polymer material is calculated by dividing the resistivity of an electrolytic solution with a polymer membrane in place by the resistivity of the same electrolytic solution alone. For good conductivity, the resistivity ratio should be close to one. A ratio of one indicates no hindrance to electrical conductivity of the electrolyte solution due to the presence of the membrane in the electrolyte solution.

A ratio, which is close to one, indicates that the polymer has a continuous pore structure. The resistivity of a potassium chloride electrolyte solution is measured. The polymer is positioned in the same solution as a membrane and a platinum electrode is placed on each side of the membrane. The resistivity of the solution with the polymer membrane therein is then measured. The ratio is calculated as set forth above.

Porosity of the polymer material is readily obtained by determining the difference in density between the initial impervious polymer and the leached polymer divided by the density of the initial impervious polymer multiplied by 100.

Gas flow measurements were made by flowing nitrogen gas at 20 pounds per square inch gauge through a test fixture which exposed 13.5 square centimeters of the leached material. This gave a measure of gas permeability in terms of milliliters of gas passing through the leached material per minute per square centimeter of surface area.

High porosity of about 40 percent or greater and a low gas flow within a range of about 20 to 200 milliliters per minute as described above discloses that the porous polymer article has an ultrafine porous structure with substantially uniformly distributed continuous and interconnecting pores. Such a porous structure is the type discussed in the present application. However, a porous polymer, which has both high porosity and a high gas flow, is a structure with many large pores but which is not an ultrafine porous structure. A polymer, which shows low porosity and a low gas flow, is a structure which has very few pores which are neither continuous nor interconnected. Such a structure is not an ultrafine porous polymer.

Measurements were also made by producing electron micrographs of the material. These micrographs showed the configuration of the pores and actual measurements to be made of the pore dimensions.

EXAMPLES I–IV

In each of Examples I–III, the solid thermoplastic polymer was crystalline polyethylene. In Example IV, the polymer was crystalline polypropylene. Sodium benzoate, a soluble organic salt additive was employed for incorporation into the above crystalline thermoplastic polymers. The ratio of the polymer to the sodium benzoate in weight ratios is set forth below in Table I.

TABLE I

| Example No. | Ratio Polymer/Solid |
|---|---|
| I | 1:3.5 |
| II | 1:4 |
| III | 1:3.5 |
| IV | 1:3.5 |

In each of these examples, sodium benzoate in a ratio as set forth above in Table I was incorporated into a solid thermoplastic polymer body of polyethylene or polypropylene to produce an ultrafine porous polymer article in which the polymer has a high porosity of about 40 percent and greater provided by ultrafine and substantially uniformly distributed continuous and interconnecting pores of diameter from 40 to 120 A.

In the preparation of the materials described above and shown in Table I, the crystalline polyethylene was milled initially on hot differential rolls at a temperature of 140° C. The crystalline polypropylene was milled initially in the same manner but at a temperature of 180° C. Sodium benzoate was then added and the milling continued thereby forming a heterogeneous blend of the two materials. Each of the materials set forth in the above Examples were sheeted off at a temperature of 127° C. to form sheets of about 5 mils thick. The material set forth in Example IV was sheeted at 175° C. After cooling, these sheets were washed in running water at a temperature in a range from 45° to 50° C. for about 8 hours.

The following Table II shows the properties of the polymer articles of Examples I–IV were made in accordance with applicants' invention prior to metal coating:

TABLE II

| Example No. | Porosity | Resistivity Ratio | Gas Flow ml/min/cm² |
|---|---|---|---|
| I | 52% | 1.21 | 6.45 |
| II | 49% | 1.31 | 11.85 |

Examples III and IV were examined by making electron micrographs thereof. Each micrograph showed the material to have ultrafine pore diameters of the order of 100 A or less.

EXAMPLE V

A copper coating was applied to a surface of the ultrafine porous polymer materials similar to those prepared in Examples I–IV using the electroless plating technique. The surface to be coated was first activated by dipping the porous polyolefin into a stannous chloride solution, rinsing in water and then dipping into a palladium chloride solution. After rinsing, it was dipped into an accelerator solution for 2 to 3 minutes. The samples were then rinsed again and placed in an electroless copper plating solution for 5 minutes. The resulting composite material had a bright porous copper metal coating on the surface.

A sample which had been plated with copper was subsequently gold plated by dipping the copper plated composite into an immersion gold solution at 60° C. for 10 minutes.

The properties of the copper and/or gold plated ultrafine porous polymer composites were determined as follows:

A. Conductivity

Two samples of the ultrafine porous polymer materials, 0.0054 inch thick and 1 inch in diameter, were coated on both sides with a thin layer of copper by electroless plating. One of these samples was further coated with gold. The metal-membrane-metal composites were then placed between silver electrodes and the a.c. resistance was measured at 1 kHz with a bridge. The resistance of both samples were higher than the maximum reading of the bridge which was $3 \times 10^9$ ohm-cm. Placing probes about 1 inch apart on the same side of the membrane showed a resistance of less than 1 ohm.

B. Porosity and Pore Structure

Samples of porous polyethylene with density 0.536 g/cm$^3$ (equivalent to 44 percent porosity) were tested for gas permeability at different applied pressures before and after the application of metal coatings with the following results given in milliliter per minute per square centimeter:

TABLE III

| Differential Pressure psi | Gas Permeability | | |
|---|---|---|---|
| | Blank | Cu covered | Cu + Au covered |
| 5.3 | 2.07 | 2.02 | 0.31 |
| 25.3 | 5.9 | 3.9 | 1.04 |
| 45.3 | 8.8 | 6.2 | 1.61 |
| 65.3 | 11.6 | 8.2 | 2.14 |

The permeability is a measure of pore size, since the gas flow is proportional to the cube of pore size. Hence, in the light of this cubic relation it is seen that the copper coating leaves the pore size unchanged and that the subsequent gold coating changed the pore size by less than a factor of 2.

EXAMPLE VI

The ultrafine porous polypropylene material prepared as in Example IV was copper plated by electroless deposition as described in Example V. The composite material was then vacuum dried and impregnated with trichloro diphenyl sold under the trademark PYRANOL 1499. The samples had been thoroughly washed after plating and before impregnation with the dielectric fluid. The impregnated article had a dissipation factor (tan δ) at 60 Hz and 25° C. of 0.018 and a dielectric constant of 4.0. This indicates that the impregnated article is useful in producing electrical capacitors.

The underlying principle, upon which the ultrafine porous polymer material is surface coated with the metal by electroless deposition, is the fact that the polymer material is hydrophobic in nature which therefore leaves the pores unfilled during the plating process. However, this does not exclude the possibility of subsequently using the metal plated polymer composite in applications where the composite is filled with water or aqueous solutions. The impregnation of the metal coated, ultrafine porous polymer composite with aqueous media can be achieved by initially filling it with an organic solvent and subsequently exchanging the liquid organic phase with water by equilibration. In order for this to work, the organic phase and the aqueous phase must be miscible. Thus, the use of the metal coated, porous ultrafine coated composites is extended to systems requiring the presence of an aqueous phase, such as electrorefining, electrodeposition, electrodialysis, battery application and the like.

It will be appreciated that the invention is not limited to the specific details shown in the examples and illustrations and that various modifications may be made within the ordinary skill in the art without departing from the spirit and scope of the invention.

We claim:

1. A porous metal coated, ultrafine porous polymer article comprising,
    a. a hydrophobic thermoplastic polymer body selected from the group consisting of crystalline thermoplastic polymers exhibiting at least 70 percent crystallinity and blends of such crystalline thermoplastic polymers and thermoplastic polymers exhibiting up to 65 percent crystallinity wherein the thermoplastic polymer exhibiting up to 65 percent crystallinity is present in an amount up to 50 weight percent of the crystalline polymer, said polymer body having a porosity of at least 40 percent by volume and containing uniformly distributed continuous and interconnecting pores having an average diameter from 40 to 120 A., and
    b. a porous metal coating selected from the group consisting of nickel, cobalt, iron, copper, silver and gold formed only on a surface of said thermoplastic polymer body by an electroless plating procedure, the pores of said body remaining uncoated.

2. The article of claim 1, wherein said polymer material is in the form of a sheet of substantially uniform thickness and having a porous metal coating on at least one surface of the sheet.

3. The article of claim 2, wherein the polymer material is filled with a dielectric fluid.

4. The article of claim 3, wherein the dielectric fluid is an askarel.

5. The article of claim 4, wherein said askarel is a chlorinated diphenyl.

6. The article of claim 2, wherein said polymer material is filled with an aqueous phase.

7. The article of claim 6, wherein said aqueous phase is an electrolyte.

8. The article of claim 2, wherein the polymer material has a porous metal coating on one surface of the sheet and another porous metal coating on the other surface of the sheet.

9. The article of claim 8, wherein the coatings are of the same metal.

* * * * *